(12) United States Patent
Sahagun et al.

(10) Patent No.: US 9,760,786 B2
(45) Date of Patent: Sep. 12, 2017

(54) METHOD AND DEVICE FOR REVISING OCR DATA BY INDEXING AND DISPLAYING POTENTIAL ERROR LOCATIONS

(71) Applicant: KYOCERA Document Solutions Inc., Osaka (JP)

(72) Inventors: Allan Sahagun, Concord, CA (US); Jacek Joseph Matysiak, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/887,441

(22) Filed: Oct. 20, 2015

(65) Prior Publication Data
US 2017/0109594 A1 Apr. 20, 2017

(51) Int. Cl.
| | | |
|---|---|---|
| G06K 9/03 | (2006.01) | |
| G06F 17/24 | (2006.01) | |
| G06F 3/0482 | (2013.01) | |
| G06F 17/27 | (2006.01) | |
| G06K 9/18 | (2006.01) | |

(52) U.S. Cl.
CPC ........... *G06K 9/033* (2013.01); *G06F 3/0482* (2013.01); *G06F 17/24* (2013.01); *G06F 17/273* (2013.01); *G06K 9/18* (2013.01)

(58) Field of Classification Search
CPC .. G06K 9/00463; G06K 2209/01; G06K 9/00; G06K 9/03–9/033; G06K 9/00456; G06K 9/18–9/186; G06K 9/2054; G06K 9/228; G06K 9/344; G06K 9/6292; G06K 9/685; G06K 2009/2045; G06K 2209/00–2209/015; G06F 3/0482; G06F 17/273; G06F 17/274; G06F 17/2765; G06F 17/2785; G06F 17/30011; G06F 17/30253; G06F 17/24–17/241; G06F 17/30321; G06T 11/60; G09B 17/003
See application file for complete search history.

(56) References Cited

U.S. PATENT DOCUMENTS 5,883,986 A * 3/1999 Kopec ................. G06K 9/72
382/155
9,292,739 B1 * 3/2016 Gray ................... G06K 9/033
(Continued)

FOREIGN PATENT DOCUMENTS

JP 2015-049820 A 3/2015

*Primary Examiner* — Jose Couso
(74) *Attorney, Agent, or Firm* — McDonnell Boehnen Hulbert & Berghoff LLP (57) ABSTRACT

The present disclosure is directed to systems, methods, and devices that enable the revising of Optical Character Recognition (OCR) data by indexing and displaying potential error locations within the OCR data. The primary method for revising the OCR data includes a terminal device indexing, displaying, receiving editing operations for, and editing the OCR data. The terminal device is configured to revise OCR data and includes an OCR review element, which, in some embodiments, is a software stored on a non-transitory, computer-readable medium, that is executed by a processing unit to cause the terminal device to index, display, receive editing operations for, and edit the OCR data.

20 Claims, 8 Drawing Sheets

(56) References Cited

U.S. PATENT DOCUMENTS

| | | | |
|---|---|---|---|
| 2011/0280481 A1* | 11/2011 | Radakovic | G06K 9/033 382/177 |
| 2013/0246436 A1* | 9/2013 | Levine | G06F 17/2765 707/741 |
| 2015/0378539 A1* | 12/2015 | Nickolaevich | G06F 17/273 715/255 |
| 2016/0203625 A1* | 7/2016 | Khan | G06T 11/60 345/636 |

* cited by examiner

METHOD AND DEVICE FOR REVISING OCR DATA BY INDEXING AND DISPLAYING POTENTIAL ERROR LOCATIONS

BACKGROUND

Unless otherwise indicated herein, the materials described in this section are not prior art to the claims in this application and are not admitted to be prior art by inclusion in this section.

Optical Character Recognition (OCR) is a method for extracting textual information (OCR data) from a target image and converting it into a different format. OCR is commonly used to digitize documents that were not previously in a digital form or when an original, digital copy is inaccessible. One example use of OCR involves the extraction of a license plate number from a vehicle using a digital image of the license plate taken with a camera.

OCR does not always provide flawless transcriptions of the textual information within the target image, however. Errors can occur due to such factors as an unknown font in the target image, a subject in the target image being disposed at an angle, or an existence of dirt, smudges, scratches, or glare within the target image.

In order to correct such errors, users of OCR devices customarily visually skim through the transcribed OCR data looking for character errors and word errors. Such an error correction technique can require substantial time, depending on the amount of textual information contained within the target image. Furthermore, errors can be accidentally missed using such an error correction approach.

SUMMARY

The present application discloses embodiments that relate to systems, methods, and devices for revising OCR data. The OCR data revision occurs by indexing the errors within the OCR data, establishing where any potential errors may be present within the OCR data, and displaying the locations of those potential errors for review.

In one aspect, the present application describes a method of revising OCR data. The method includes indexing, by an OCR review element executed by a processing unit on a terminal device, locations of potential errors within the OCR data. The method also includes displaying, by the terminal device, a region within the OCR data that corresponds to one or more of the locations of potential errors. Additionally, the method includes receiving, from an input device, an editing operation indicating a correction to be made to the OCR data. The method further includes editing, by the terminal device the OCR data in response to the editing operation.

In a different aspect, the present application describes a terminal device configured to revise OCR data. The terminal device includes a processing unit configured to execute an OCR review element. The OCR review element is stored on a non-transitory, computer-readable medium and is configured to index locations of potential errors within the OCR data. Additionally, the OCR review element is configured to modify the OCR data. The terminal device also includes a display that is configured to display the OCR data. The terminal device further includes an input device, wherein the input device is configured to accept editing operations to be made to the OCR data.

In yet another aspect, the present application describes a non-transitory, computer-readable medium that includes an OCR review element configured to be executed by a processing unit. Furthermore, upon execution by the processing unit, the OCR review element is configured to revise OCR data. The revision of the OCR data includes indexing locations of potential errors within the OCR data. The revision of the OCR data also includes displaying a region within the OCR data that corresponds to one or more of the locations of potential errors. In addition, the revision of the OCR data includes receiving an editing operation indicating a correction to be made to the OCR data. Further, the revision of the OCR data includes editing the OCR data in response to the editing operation.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

I. Overview

An example embodiment involves a terminal device extracting and revising OCR data. In one embodiment, this terminal device is a mobile computing device, such as a tablet computing device.

In one embodiment, an image forming apparatus, such as a scanner or a Multi-Function Peripheral (MFP), obtains a target image and transmits it to a repository, such as a cloud storage space. The terminal device may then download the target image from the repository. In addition to downloading the target image, the terminal device may extract textual information from the target image using OCR.

After obtaining the textual information (OCR data), the terminal device indexes the OCR data for potential errors. This may include calculating an OCR certainty level for each identified character and comparing the certainty level to a minimum threshold certainty level, such that at the threshold certainty level, the OCR data is correct a sufficient percentage of the time.

Once the potential errors have been indexed, the terminal device may display a list of the locations of potential errors within the OCR data. This list of potential error locations may also display the OCR certainty level associated with each error. An input may be accepted on an input device to select one of the displayed locations.

The terminal device may then display the region of the OCR data corresponding to the selected location, as well as the corresponding location within the target image from which that data was extracted. The terminal device may additionally display a list of suggested corrections for the region of the OCR data, as well as provide tools for manually correcting the selected location in the OCR data. Further, the terminal device may display translations of the OCR data in alternate languages. These languages may also represent permanent revisions that can be made to the OCR data.

A desired revision to the OCR data may be communicated via the input device. The terminal device, in response, may alter the OCR data to reflect the revision. Such an alteration may include updating a change history, which is a log of all prior changes made to the OCR data.

II. Example Systems

Figure 1:
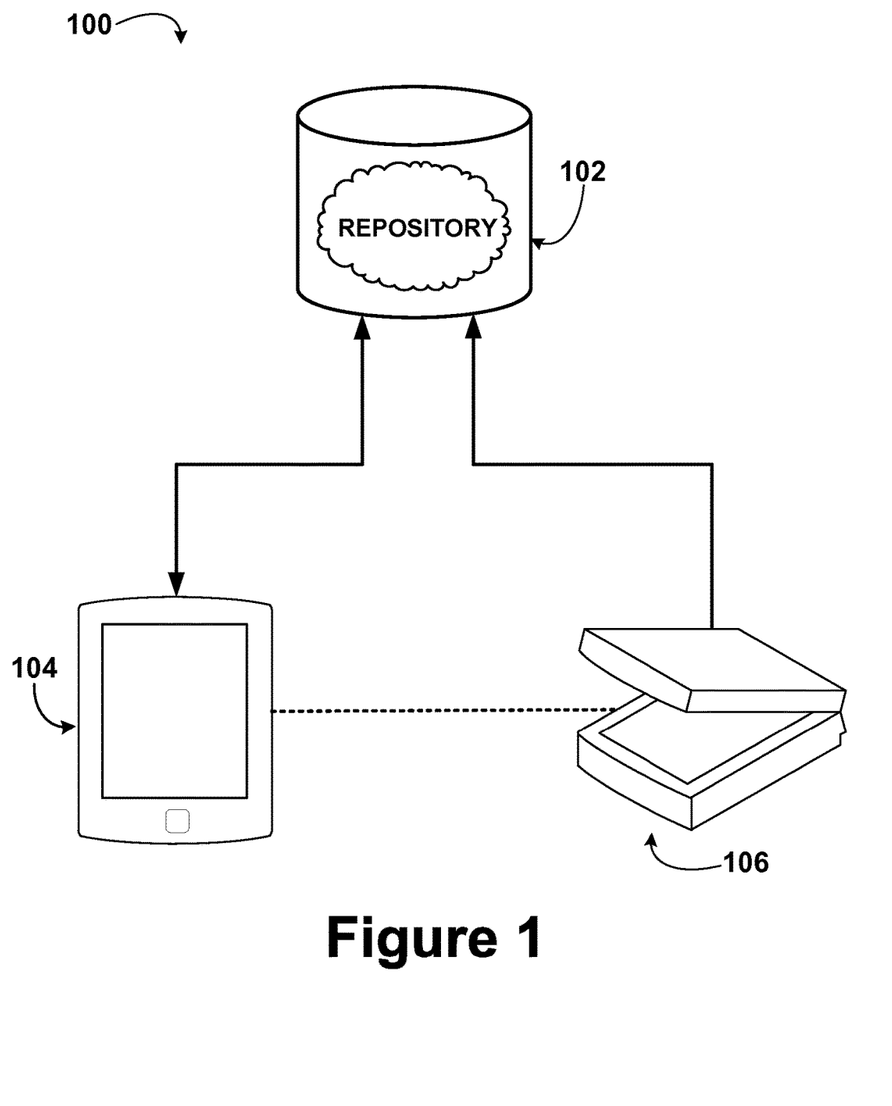
FIG. 1 is a schematic diagram illustrating a system, according to an example embodiment.

FIG. 1 is a schematic diagram illustrating a system 100, according to an example embodiment. The system 100 includes a repository 102, a terminal device 104, and an image forming apparatus 106. Communication occurs between the repository 102 and the terminal device 104, as well as between the repository 102 and the image forming apparatus 106. In some embodiments, there may additionally be communication between the terminal device 104 and the image forming apparatus 106. These communications may occur through a connection over a local-area network (LAN) and/or a wide area network (WAN), such as the public Internet. Connection to such a network could occur in a wired manner, using Ethernet, or wirelessly, using Wi-Fi (IEEE 802.11 standards), for instance. Additionally, the repository 102, terminal device 104, and image forming apparatus 106 may communicate more directly with one another. This type of direct communication may occur using Bluetooth, for example.

The repository 102 may be a cloud storage space associated with a server. In some cases, the repository 102 may be a private or commercial cloud storage service. In some embodiments, requesting a target image file or an OCR data file from the repository 102 may include specifying a link or other reference to the remotely-stored file. Such a request may also require login credentials to authenticate a device before the device retrieves documents stored in the repository 102.

In some embodiments, the repository 102 will store a target image obtained by and transmitted from the image forming apparatus 106 until a time when the terminal device 104 requests the target image. The repository 102 may also, in some embodiments, store an image obtained by the terminal device 104 for later processing by the terminal device 104 or for processing by a secondary terminal device. Additionally, in some embodiments, the repository 102 may store previously transcribed OCR data from either the terminal device 104 or the image forming apparatus 106.

The terminal device 104 may be a mobile computing device, such as a tablet computing device or a mobile phone, in some embodiments. In alternate embodiments, the terminal device 104 may be a desktop or laptop computing device. The terminal device 104 is configured to process OCR data, but may have additional functionality.

The image forming apparatus 106 may be a scanner, in some embodiments. Alternatively, the image forming apparatus 106 may be a standalone facsimile unit, or a facsimile unit or a scanning unit included within an MFP. The image forming apparatus 106 is configured to digitize a physical subject. In some embodiments, the digitization includes forming a two-dimensional (2D) image of the subject. An example of a digitization from such an embodiment is the conversion of a printed image, such as a photograph or document, into a digital document, such as a Portable Document File (PDF) or a Portable Network Graphics (PNG) file, using a scanner.

Upon the digitization of the subject, the image forming apparatus 106 is further configured to communicate this digital data to the repository 102 via a network interface. Such a network interface may include, in some embodiments, Ethernet ports (RJ45 connector) or telephone ports (RJ11 connector) for wired connections and/or a network interface controller (NIC) to connect wirelessly over Wi-Fi.

Further, in some embodiments, the image forming apparatus 106 will have an OCR element. Such an OCR element may be a software stored within a non-transitory, computer-readable medium, that, when executed by a processor, is configured to extract textual information (OCR data) from a target image. Such an OCR extraction capability may allow the image forming apparatus 106 to transmit the extracted OCR data, in addition to the target image, to the repository 102, thereby preventing unnecessary OCR processing steps in the future.

III. Example Devices

Figure 2:
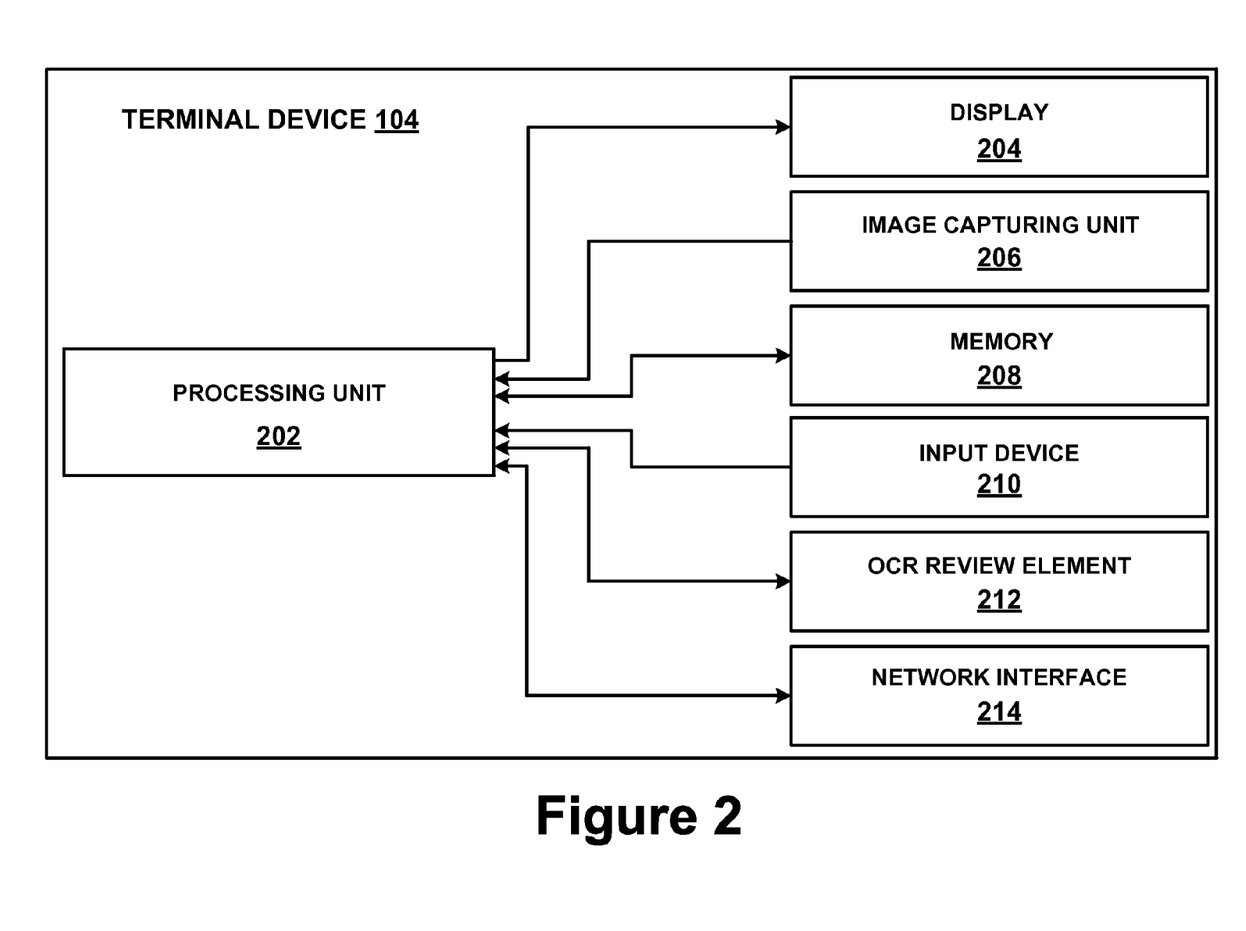
FIG. 2 is a schematic block diagram illustrating a terminal device, according to an example embodiment.

FIG. 2 is a schematic block diagram of the terminal device 104, according to an example embodiment. The terminal device 104 includes a processing unit 202, a display 204, an image capturing unit 206, a memory 208, an input device 210, an OCR review element 212, and a network interface 214.

The processing unit 202 may include one or more processors capable of executing instructions, such as the OCR review element 212, stored on computer readable media, such as the memory 208, which cause the terminal device 104 to perform various operations. The processing unit 202 may include general-purpose central processing units (CPUs) and cache memory. In causing the terminal device 104 to perform various operations, the processing unit 202 directly communicates with other units of the terminal device 104. In some embodiments, this communication occurs through connections on a motherboard.

If the terminal device 104 is a desktop computing device or a laptop computing device, as in some embodiments, the processing unit 202 may be a commercially available processing unit, such as Intel Corporation's Core i7 microprocessors or the Bulldozer microarchitecture line by Advanced Micro Devices, Inc. (AMD).

In other embodiments, when the terminal device 104 is a tablet computing device or a mobile phone, the processing unit 202 may be a microprocessor such as the Apple A8 or the Qualcomm Snapdragon series.

The display 204 serves as a device by which the terminal device 104 can externally display information. In an embodiment in which the terminal device 104 is a desktop or laptop computing device, the display 204 may be a cathode ray tube (CRT) monitor, a liquid crystal display (LCD), or a light-emitting diode (LED) display. Additionally, the display 204 may be connected to the processing unit 202 directly, via routing on a motherboard, or indirectly, via a digital visual interface (DVI) cable or high-definition multimedia interface (HDMI) cable.

In embodiments in which the terminal device 104 is a tablet computing device or a mobile phone, the display 204 may be an organic light-emitting diode (OLED) display or an LCD, for example.

The image capturing unit 206 may be disposed within the terminal device 104 in some embodiments, although the image capturing unit 206 is not integral to the functionality of the terminal device 104 as an OCR revision tool. In embodiments in which the terminal device 104 is a desktop or laptop computing device, the image capturing unit 206 may be a webcam. In a laptop computing device, such a webcam could be directly connected to the processing unit 202 using a motherboard. In a desktop computing device, the webcam may be connected to the processing unit 202 in a wired manner using a USB cable or wirelessly using Bluetooth. In some embodiments, the webcam may be configured to take both still images and video.

In tablet computing device and mobile phone embodiments of the terminal device 104, the image capturing unit 206 may be an embedded digital camera. Again, these embedded image capturing units 206 may be capable of obtaining both still photos, as well as video.

In embodiments having a terminal device 104 that has an image capturing unit 206 capable of obtaining continuous video, the image capturing unit 206 may also include a subunit that extracts individual images from the streaming video. Such a subunit would allow the image capturing unit 206 to select an individual image that could later undergo OCR extraction.

The memory 208 may be disposed within the terminal device 104 in some embodiments, although the memory 208 is not integral to the functionality of the terminal device 104 as an OCR revision tool. The memory 208 may be within the terminal device 104 to store target images and OCR data for later processing by the terminal device 104. In some embodiments, it may be that a target image acquired using the image capturing unit 206 or obtained from the repository 102 using the network interface 214 is not immediately analyzed. The target image may then be stored within the memory 208 until an appropriate time at which the target image can be utilized by other components of the terminal device 104.

In some embodiments, the memory 208 will be an internal hard drive. Additionally, the memory 208 may be a solid-state drive (SSD). Furthermore, in some embodiments, the memory 208 may be a removable component of the terminal device 104, as in the cases when the memory 208 is an external hard drive, a USB flash drive, or a secure digital (SD) card.

The memory 208 may also store information for various programs and applications. For example, the memory 208 may include data for running an operating system (OS). The memory 208 is not necessarily limited to non-volatile memory, but in some embodiments may also include volatile memory, such as random access memory (RAM). Such components may be necessary for the processing unit 202 to execute the OCR review element 212, for instance.

As with other components within the terminal device 104, the memory 208 may communicate with the processing unit 202 over integrated motherboard connections. The memory 208 may be connected to the motherboard using a Serial ATA (SATA) cable, in the case of an internal hard drive, or connected to a bus port integrated on the motherboard, in the cases of removable memory, such as an external hard drive or USB flash drive.

The input device 210 communicates a user's input to the processing unit 202. If the terminal device 104 is embodied in the form of a desktop or laptop computing device, the input device 210 may be a mouse or a keyboard. The mouse or keyboard may be connected to the processing unit 202 via internal motherboard connections, as well as connected to the motherboard in a wired manner using USB ports or PS/2 ports. Additionally, the mouse or keyboard may be wirelessly connected to the motherboard using Bluetooth.

In other embodiments, such as when the terminal device 104 is a mobile phone or a tablet computing device, the input device 210 may be a touchscreen, incorporating a touch-sensitive surface that overlays or is overlaid by the display 204. The touchscreen may be executed using resistive touch, surface capacitive, projected capacitive, or infrared (IR) touch technologies, in various embodiments.

Furthermore, in some embodiments, the input device 210 will not require tactile interaction. The input device 210 may instead be implemented as a microphone that accepts voice commands from a user or a camera that accepts hand motions or facial expressions as commands. This camera may act dually as the input device 210 and the image capturing unit 206. Depending on the embodiment, the microphone or the camera may be in direct connection with the processing unit via direct integration onto a motherboard, or may be connected to the motherboard via a USB connection or Bluetooth connection.

The OCR review element 212 is, in some embodiments, a software stored on a non-transitory, computer-readable medium. The OCR review element 212 is executed by the processing unit 202. The OCR review element 212 is configured to permit the obtaining, analysis, and revision of OCR data (explained in detail with regard to FIG. 3). Alternatively, instead of software, the OCR review element 212 may be implemented as hardware (e.g. using logic gates) or as a combination of software and hardware.

In some embodiments, particularly ones in which the terminal device 104 is a mobile phone or a tablet computing device, the OCR review element 212 may be implemented as an application. The application could be designed for iOS, Windows Phone, Android, or other mobile platforms. In one embodiment, the OCR review element 212 is written in the Objective-C language. Alternatively, the OCR review element 212 may be implemented in a JavaScript environment. Using this language would provide a portable way to bring the OCR review element 212 to browser-based devices, such as laptop computing devices and desktop computing devices. Other languages could be used as well.

The network interface 214 may be disposed within the terminal device 104 in some embodiments, although the network interface 214 is not integral to the functionality of the terminal device 104 as an OCR revision tool. The network interface 214 may be configured to enable communication between the terminal device 104 and other terminal devices, the repository 102, or the image forming apparatus 106. In some embodiments, the terminal device 104 will retrieve a target image from the repository 102 via the network interface 214. The target image may have been transmitted to the repository 102 by the image forming apparatus 106 after being acquired by the image forming apparatus 106.

The terminal device 104 could alternatively upload an image to the repository 102 that was acquired by the terminal device 104 using the image capturing unit 206 via the network interface 214. In this way, alternate terminal devices could perform OCR on the image. In other embodiments, the terminal device 104 is directly connected to the image forming apparatus 106, so transmission of images from the image forming apparatus 106 to the terminal device 104 can take place without the repository 102.

The network interface 214 is connected to the processing unit 202. This permits the processing unit 202 to send commands to the network interface 214, permitting the terminal device 104 to communicate with other devices. This connection, in some embodiments, will be via routing on a motherboard.

The network interface 214 may be a wired or wireless interface. In some embodiments, the network interface 214 will be a NIC that allows connection to the public Internet over Wi-Fi via a router. There may also be a wired connection to the public Internet, in some embodiments, using Ethernet. Additionally, the network interface 214 may communicate with the image forming apparatus 106 without the use of a public network, such as over a Bluetooth connection, for instance.

In other embodiments, the terminal device 104 will be in the same private network as the repository 102 and/or the image forming apparatus 106, so that the network interface 104 will connect the terminal device 104 to a router, either in a wired manner or wirelessly, thus allowing the terminal device 104 to communicate with other members in the network.

Figure 3:
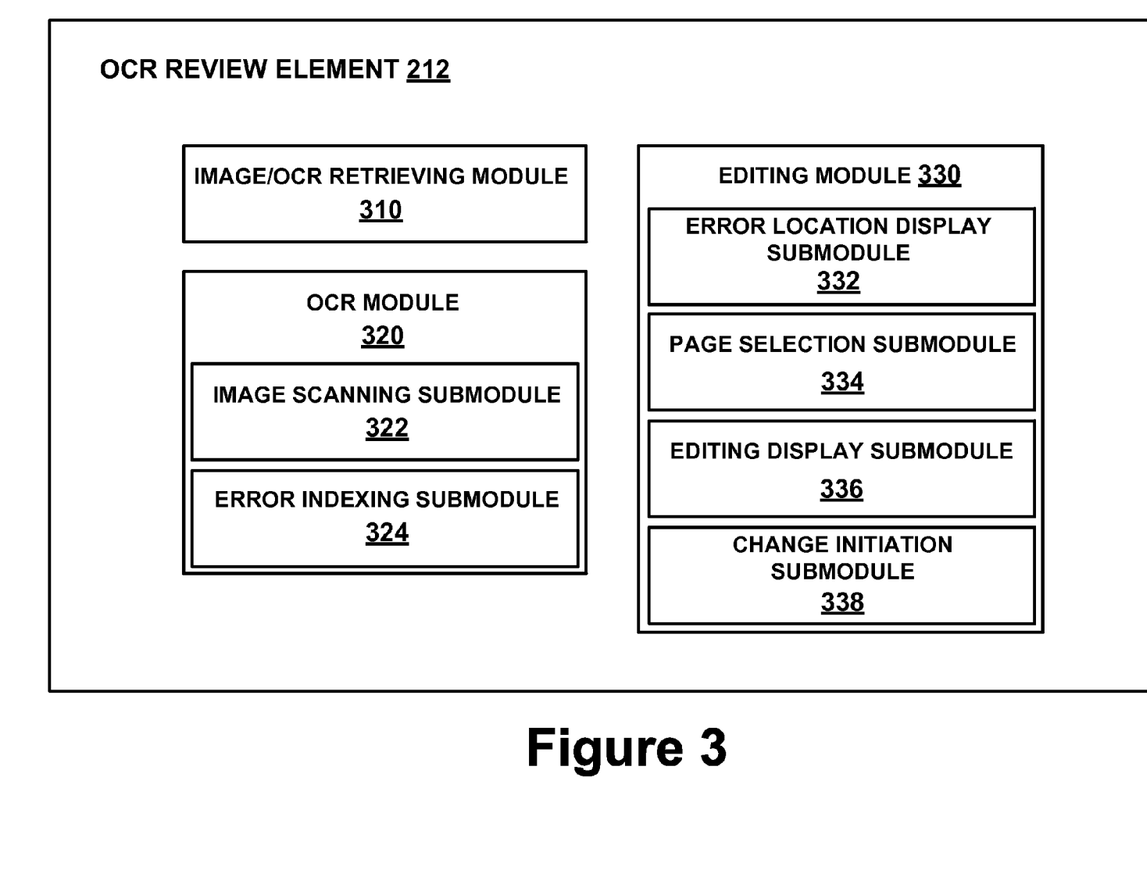
FIG. 3 is a schematic block diagram illustrating an OCR review element, according to an example embodiment.

FIG. 3 is a schematic block diagram of the OCR review element 212, according to an example embodiment. The OCR review element 212 includes an image/OCR retrieving module 310, an OCR module 320, which further includes an image scanning submodule 322 and an error indexing submodule 324, and an editing module 330, which further includes an error location display submodule 332, a page selection submodule 334, an editing display submodule 336, and a change initiation submodule 338.

The image/OCR retrieving module 310 is configured to retrieve a target image. This target image may have been captured by the image capturing unit 206, it may have been read from the memory 208 of the terminal device 104, or it may have been downloaded from the repository 102 through the network interface 214. If the target image was downloaded from the repository 102, it could have been created by the image forming apparatus 106, another terminal device, or the terminal device 104 itself at an earlier time.

Once the target image is obtained, the OCR module 320 is configured to extract textual information from the target image (perform OCR) and index potential errors. This module comprises an image scanning submodule 322 and an error indexing submodule 324. The image scanning submodule 322 is configured to perform OCR. The image scanning submodule 322 may utilize a commercial software, such as Kofax, CuneiForm, Tesseract, or ABBYY to accomplish this, for example.

In some embodiments, the OCR software implemented by the image scanning submodule 322 may use an algorithm that completes OCR based on a sufficiently large sample character library (may be specific to one or more languages), certain character classification categories, and certain pre-set recognition parameters. Further, such an OCR software may attempt to ascertain the font present within the target image, and then compare the characters present within the image to the known set of characters defined within the identified font.

The error indexing submodule 324 is configured to index the locations of potential errors within OCR data. Establishing the locations of potential errors may, in some embodiments, include establishing an OCR certainty level for each character, each word, or each set of words. This certainty level may be obtained by comparing the OCR data with known words from a dictionary or with known grammatical/linguistic patterns from the identified language.

The error indexing submodule 324 may compare the OCR certainty levels for each subset of characters to a threshold OCR certainty level. This threshold may be a default level, or a level previously set by a user, for example. Then, when the subset of characters is at or above the threshold OCR certainty level, it is deemed sufficiently accurate. Those subsets of characters that are below the threshold OCR certainty level are deemed potentially incorrect, and are indexed.

The indexing may, in some embodiments, include storing the location (character position, page/line number, sentence number, or paragraph number) within the target image of the potential error, the OCR data at that location, and a type of potential error associated with the current potential error, herein referred to as error identifiers.

The editing module 330 comprises an error location display submodule 332, a page selection submodule 334, an editing display submodule 336, and a change initiation submodule 338.

The error location display submodule 332 is configured to display a list of potential errors, indexed by the error indexing submodule 324, on the display 204. Displaying the errors on the display 204 may include displaying any subset of the error identifiers associated with each potential error.

The page selection submodule 334 is configured to accept an input from the input device 210 denoting a jump to one of the potential errors that are displayed within the error location display submodule 332. The page selection submodule 334 is further configured to jump to the location in the OCR data that was denoted by the input from the input device 210.

The editing display submodule 336 is configured to display, on the display 204, the location within the OCR data, as well as the corresponding location within the target image in some embodiments, that corresponds to the potential error jumped to by the page selection submodule 334.

In some embodiments, a translation of the OCR data into different languages may also be displayed. This may be provided so that the OCR data is legible by users whose native language is different from the language of the text in the target image. Additionally, it may be provided so a permanent conversion of the OCR data to a different language may occur. There may be a default language to which the OCR data is translated, or alternatively, a language for translation may be selected.

In still further embodiments, suggested changes to the OCR data based on grammar and spelling may be displayed. The editing display submodule 336 may display a list of words that are close in spelling to a word that is established as potentially incorrect by the error indexing submodule 324. The listing of alternative words may rank words by frequency of use in the rest of the OCR data.

Additionally, tools for editing the OCR data may be displayed on the display 204 by the editing display submodule 336. In some embodiments, a tool for saving changes made to the OCR data may be displayed. In other embodiments, a tool indicating from where in the target image the current OCR data was extracted may be displayed. In still other embodiments, a tool for editing the typesetting of the OCR data may be displayed. Various other tools which may aid in the editing of the OCR data are possible.

The change initiation submodule 338 is configured to correct the OCR data, if an error in transcription of the target image is indicated by an input from the input device 210. If a correction is indicated by the input device 210, the change initiation submodule 338 will then modify the OCR data.

Modifying the OCR data may include saving a new OCR data file (overwriting the previous OCR data file) with the correct transcription now present and/or editing a change history file, which lists all the changes made to the original OCR data. The change history file is established to permit later review of the changes made to the OCR data, in case a change was made in error or the original transcription is desired. Modifying the OCR data may further include removing the potential error and potential error location of the edited error from the list of potential errors, in some embodiments.

It will be understood that the error correction scheme described in the background section will still be possible using the OCR review element 212. In some embodiments, an option of whether to index potential errors will be selectable within the editing module 330. If this option is not selected, a review of the entire OCR data file to search for errors, without indexing (comparing OCR certainty levels to threshold OCR certainty levels), may still be executed.

IV. Example Methods

Figure 4:
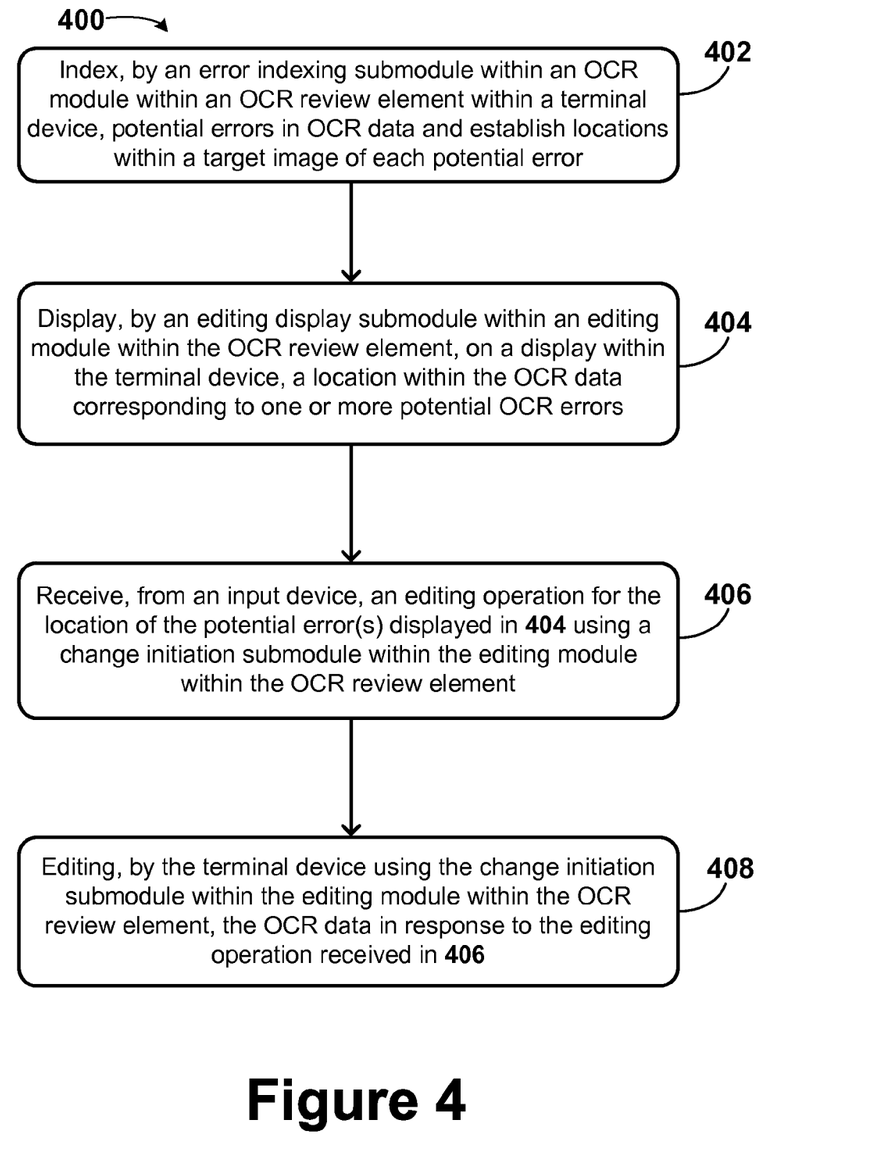
FIG. 4 is a flowchart illustrating a method, according to an example embodiment.

FIG. 4 is a flowchart of a method 400 of editing OCR data, according to an example embodiment. The method 400 is performed on a terminal device 104 by executing an OCR review element 212 using a processing unit 202.

At step 402, the method 400 includes indexing, by an error indexing submodule 324 within an OCR module 320 within the OCR review element 212, potential errors in the transcribed textual content (OCR data) and establishing locations within a target image, corresponding to the OCR data, of each potential error.

Step 402 may include, in some embodiments, initiating the OCR review element 212 within the terminal device 104 via an input device 210. This may include receiving a point-and-click input of an icon that is indicated on a display 204. The processing unit 202 may then, in response, begin executing the OCR review element 212.

In some embodiments, as previously disclosed, indexing the potential errors in step 402 may include comparing an OCR certainty level for each subset of characters to a threshold OCR certainty level. Those subsets of characters having an OCR certainty level below the threshold OCR certainty level are deemed potentially incorrect, and are recorded.

Additionally, step 402 may include retrieving, by an image/OCR retrieving module 310 within the OCR review element 212, the target image for processing. In some embodiments, this includes an image capturing unit 206 obtaining the target image. In other embodiments, this includes a network interface 214 obtaining the target image from a repository 102. In still other embodiments, the target image is transmitted directly from an image forming apparatus 106 to the terminal device 104.

In some embodiments, when the target image is retrieved from the repository 102 or sent directly by the image forming apparatus 106 as part of step 402, the target image is accompanied by the transcribed OCR data associated with the target image. It is possible, for example, that another terminal device or the image forming apparatus 106 already performed an OCR extraction before transmitting the target image to the repository 102 or to the terminal device 104.

Step 402 also includes, in some embodiments, processing, by an image scanning submodule 322 within the OCR module 320 within the OCR review element 212, the target image to extract textual information contained within the target image (performing OCR). If, however, the target image were accompanied by previously transcribed OCR data, this step may be unnecessary.

Further, at step 402, after completing the OCR extraction, if necessary, an OCR file may be generated to save the data. This OCR file may be saved by the OCR review element 212 in a memory 208.

At step 404, the method 400 includes displaying (on the display 204), by an editing display submodule 336 within an editing module 330 within the OCR review element 212, a location within the OCR data that corresponds to one or more of the locations of potential errors indexed in step 402.

In some embodiments, prior to displaying the location of the potential errors, step 404 may include displaying (on the display 204), by an error location submodule 332 within the editing module 330 within the OCR review element 212, a list of the locations of the potential errors in the OCR data. Displaying the list may include displaying associated error identifiers with each potential error, as discussed previously.

Step 404 may additionally include, in some embodiments, receiving, from the input device 210, a selection of the potential error location, and then jumping to that location using a page selection submodule 334 within the editing module 330 within the OCR review element 212. Jumping to the location of the error may include a jumping to a specific character location, page/line number, sentence number, or paragraph number within the OCR data.

In addition to displaying the OCR data at the location corresponding to one of the potential errors, step 404 may additionally include displaying the corresponding location within the target image. In some embodiments, the editing display submodule 336 may also display tools for modifying the OCR data. Such tools may allow for the addition/deletion of characters, provide suggestions as to possible corrections, or give a translation of the OCR data into a different language, for example.

At step 406, the method 400 includes receiving, from the input device 210, an editing operation for the location of the potential error displayed in 404 using a change initiation submodule 338 within the editing module 330 within the OCR review element 212. The editing operation indicated could be the deletion of a character, the addition of a character, or the modification of a character, for instance.

At step 408, the method 400 includes editing, by the terminal device 104 using the change initiation submodule 338 within the editing module 330 within the OCR review element 212, the OCR data in response to the editing operation received in step 406. Again, as described previously, editing the OCR data may include modifying the OCR data. Modifying the OCR data may include saving a new OCR data file, overwriting the previous file with the correct transcription now present, and/or editing a change history file, which lists all changes made to the original OCR data. Modifying the OCR data may further include removing the potential error and potential error location of the edited error from the list of potential errors, in some embodiments.

Figure 5:
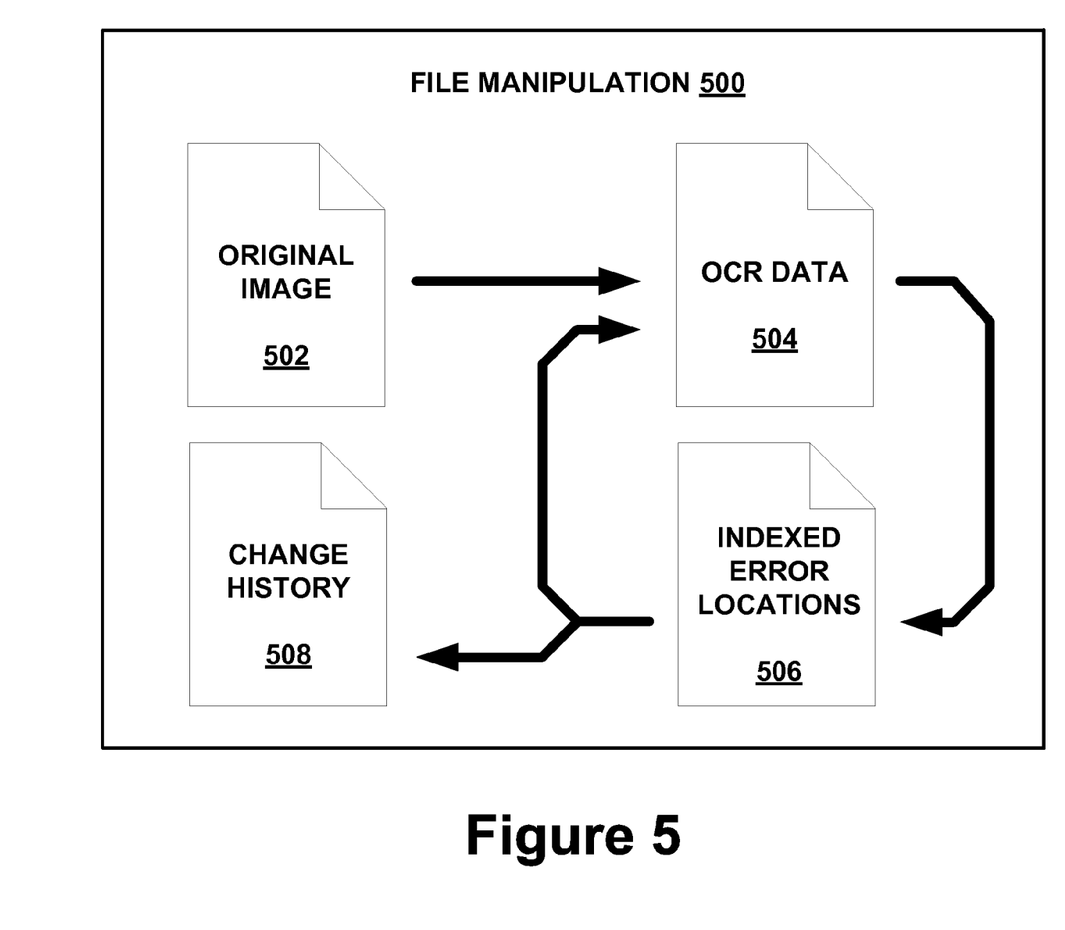
FIG. 5 is a schematic block diagram illustrating a file manipulation scheme, according to an example embodiment.

FIG. 5 is a schematic block diagram illustrating a file manipulation 500 scheme, according to an example embodiment. The file manipulation 500 includes an original image 502, OCR data 504 (influenced by the original image 502 and an indexed error locations 506 file), the indexed error locations 506 file (influenced by the OCR data 504), and a change history 508 (influenced by the indexed error locations 506 file). The files depicted in file manipulation 500 may be stored locally in a memory 208 within a terminal device 104 or remotely in a repository 102, in various embodiments.

The original image 502 is a target image, obtained by either an image forming apparatus 106, or an image capturing unit 206 within the terminal device 104 or another terminal device. The original image 502 is obtained prior to extracting textual information by performing OCR. In some embodiments the original image 502 would be saved in one of the following file formats: Joint Photographic Experts Group (JPEG), Tagged Image File Format (TIFF), Graphics Interchange Format (GIF), Portable Network Graphics (PNG), Bitmap (BMP), or Portable Document Format (PDF).

The OCR data 504 represents a conversion of the original image 502 to OCR data 504. It is the file that is the result of performing OCR on the original image 502. This file would either be created by the terminal device 104 or the image forming apparatus 106 upon a completion (or a partial completion) of an OCR scan of the original image 502.

The OCR data 504 comprises a list of the identified characters within the original image 502, as well as the locations of those characters within the original image 502. The OCR data 504 will, in some embodiments, be formatted as a text file (.txt) or a comma-separated values file (.csv). In other embodiments, it may be advantageous to save the OCR data 504 as a Microsoft Word file (.doc or .docx), in order to maintain formatting or when the amount of text in the OCR data 504 file is large.

The indexed error locations 506 file comprises a list of the potential transcription errors contained within the OCR data 504. The indexed error locations 506 file is created after the error indexing submodule 324 indexes the OCR data 504 (as in step 402 of method 400). The indexed error locations 506 file may include, in addition to the locations of potential errors, associated error identifiers that provide metadata about the type of error that may be occurring at the specified location within the OCR data 504. The indexed error locations 506 file may be formatted as a text file (.txt) or comma-separated values file (.csv), for example.

If, based on the potential errors in the indexed error locations 506 file, it is established that an error within the OCR data 504 has indeed occurred, a received input from the input device 210 may indicate a requested change to the OCR data 504 (as in step 406 of method 400). The original OCR data 504 is accordingly modified and resaved (as in step 408 of method 400). In addition, a modification to the change history 508 may be made. In some embodiments, the indexed error will be removed from the indexed error locations 506 file, as well.

The change history 508 comprises a list of all revisions previously made to the OCR data 504. This change history may include the following for each change: a description of the change to the OCR data 504, the location of the change made to the OCR data 504, a timestamp of the date/time when the change was made, and the OCR certainty level associated with the error before the change was made. In some embodiments, the change history 508 may also be fed back into the OCR data 504, in case it were ever necessary to remove all modifications to the OCR data 504, and revert to the original extracted OCR data 504. As with the OCR data 504 file and the indexed error locations 506 file, the change history 508 file may be formatted as a text file (.txt) or comma-separated values file (.csv), for example.

V. Example Interfaces

Figure 6:
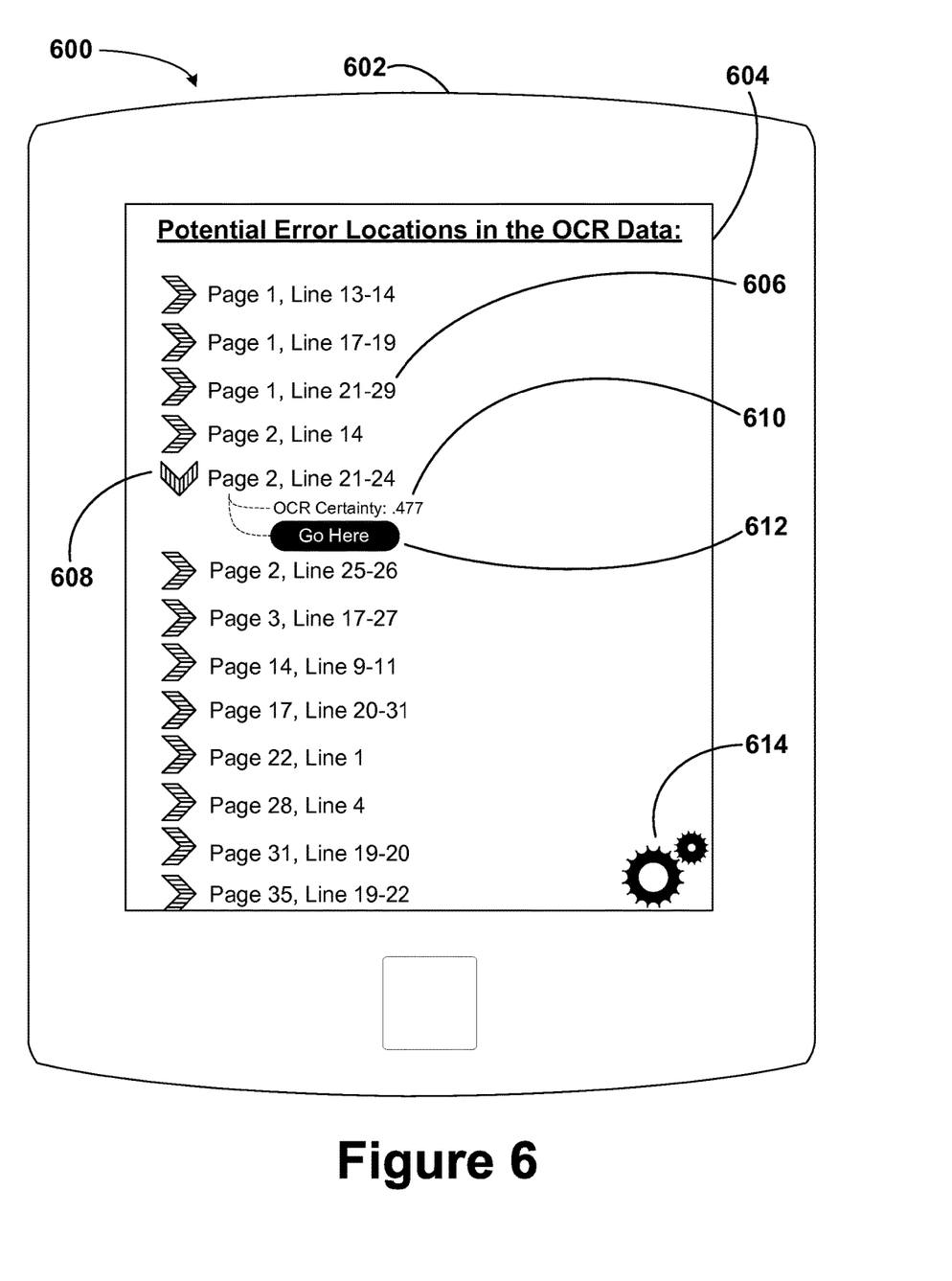
FIG. 6 is an illustration of an error location display, according to an example embodiment.

FIG. 6 is an illustration 600 of an error location display on a display 604 within a terminal device 602, according to an example embodiment. The error location display includes a location associated with each potential error 606, an expanding button associated with each potential error 608, an OCR certainty level 610 associated with each expanded error, a jump-to button associated with each expanded error 612, and a settings button 614.

This may be the appearance of a user interface that is displayed by an error location display submodule 332 within an editing module 330 within an OCR review element 212 when executed by a processing unit 202, such as in some embodiments of step 404 of method 400.

The location associated with each potential error 606 indicates where within a target image each potential OCR data error is located. As illustrated, the location within the target image is given by page number and line numbers. In alternate embodiments, the location may be listed by sentence number, paragraph number, or character number, instead.

The expanding button associated with each potential error 608 allows for expanding the details associated with a specific potential error. When engaged, metadata associated with the corresponding potential error is displayed, as indicated in the illustration 600.

The OCR certainty level 610 associated with each expanded error is one example piece of metadata that may be displayed upon engaging the expanding button 608. The OCR certainty level 610 may have been established previously when an OCR extraction was initially executed, as in some embodiments of step 402 of method 400. Additional metadata may be provided about each error in other embodiments, as well.

The jump-to button associated with each potential error 612 allows for displaying the location of the potential error within the OCR data or the target image. Upon engaging the jump-to button 612, labeled "Go Here" in this example embodiment, the location of the potential error would be displayed using a page selection submodule 334 within the editing module 330 within the OCR review element 212. This may occur in some embodiments of step 404 of method 400.

The settings button 614 allows for displaying an options menu. Upon engaging the settings button 614, indicated in this embodiment by a gear symbol, an options menu would be displayed. One of the options may be to set the threshold OCR certainty level, such that only OCR certainty levels below that threshold are displayed as potential errors. The options menu may further allow a selection of how the location of each potential error is displayed (page number, line number vs. paragraph number vs. sentence number vs. character number).

Figure 7:
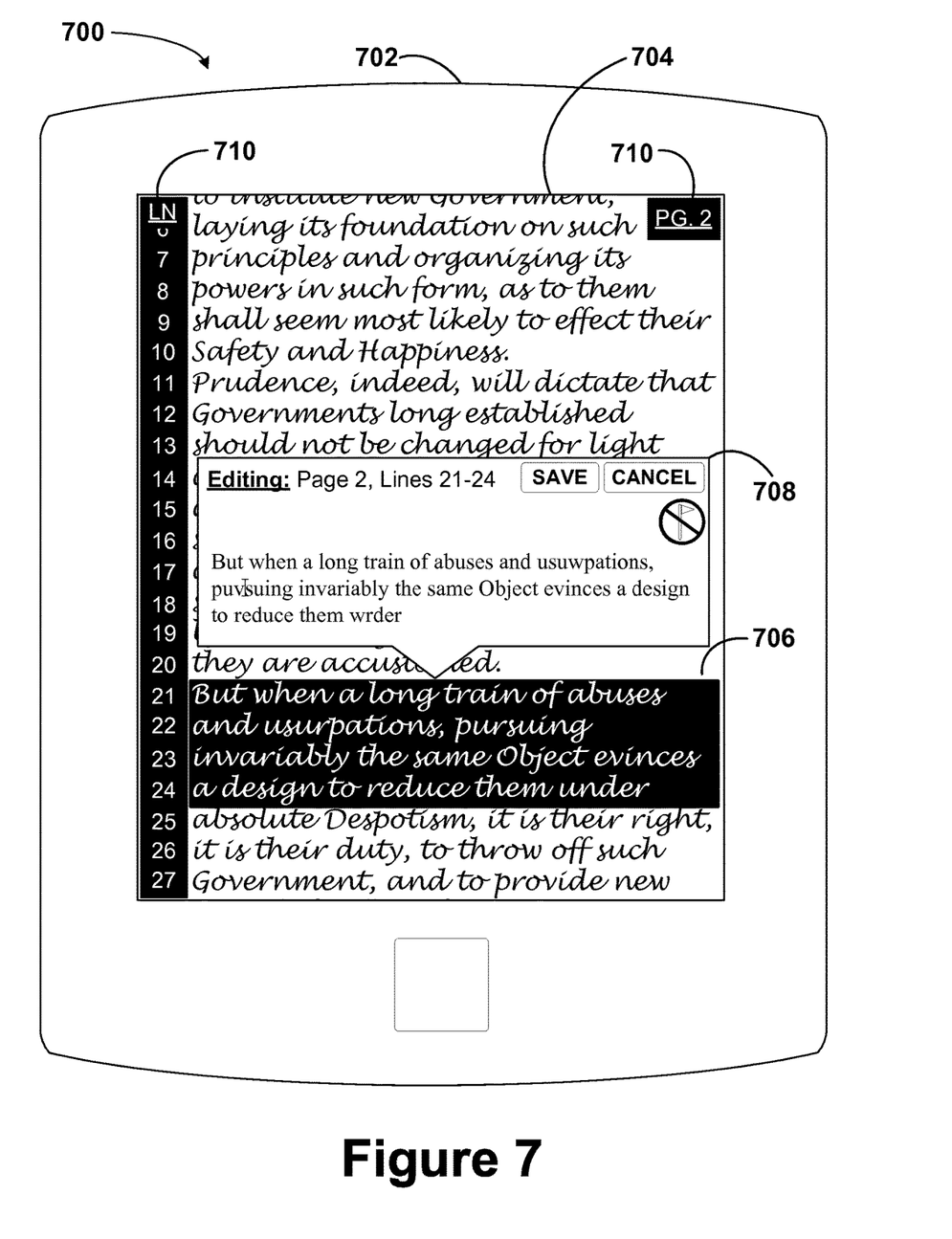
FIG. 7 is an illustration of an editing display, according to an example embodiment.

FIG. 7 is an illustration 700 of an editing display on a display 704 within a terminal device 702, according to an example embodiment. The editing display includes a highlighted portion 706 of a target image, an editing box 708, and location indicators 710. In the illustration 700, the target image (cursive text) is overlaid by the editing box 708.

This may be the appearance of a user interface that is displayed by an editing display submodule 336 within an editing module 330 within an OCR review element 212 when executed by a processing unit 202, such as in some embodiments of step 404 of method 400.

The highlighted portion 706 of the target image corresponds to a potential error currently being reviewed. In some embodiments, the highlighted portion 706 is selected by a page selection submodule 334 when it jumps to the location of the potential error. Additionally, manual selection of more or less of the target image for OCR data review, may be possible. This may occur by engaging additional regions of the editing display, using an input device within the terminal device 702, such as by using a "click and drag" motion with a mouse if the terminal device 702 were a desktop computing device or a "press and hold" gesture with a touchscreen if the terminal device 702 were a tablet computing device.

Furthermore, using the input device within the terminal device 702, scrolling to different locations within the target image may be possible. This would allow manual inspection of all areas of the target image as well as the corresponding OCR data.

The editing box 708 displays tools to aid in the editing of OCR data. The current page and line numbers are displayed, in this embodiment, within the editing box 708 based on what section of the target image is selected. In addition, the corresponding, extracted OCR data is shown in the editing box 708. From the editing box 708, text can be added, modified, or deleted, so that the OCR data matches the text in the target image.

There are also, in this embodiment, two buttons disposed within the editing box 708. Engaging the "SAVE" button would save the changes to the OCR data made within the editing box 708, as in step 406 of method 400, whereas engaging the "CANCEL" button would cancel any changes made to the OCR data within the editing box 708. After either of these buttons are engaged, the user interface depicted in FIG. 6 may appear on the display 704.

Additionally, in this embodiment, the editing box 708 provides an option to "unflag" the potential error. This option is initiated, in this embodiment, by engaging the button with the symbol of a flag with a crossed circle on it. If the "unflag" button is engaged, it is an indication that the OCR data is correct in the highlighted region. This denotes to the OCR review element 212 that the indexed potential error corresponding to the highlighted region is not an actual error, and should no longer be in the potential error listing. Engaging this button may remove the potential error from the list of indexed potential errors.

The location indicators 710 display the page number and line numbers currently being displayed within the target image. In some embodiments, the line numbers are an estimate of where each line number is located within the specific page based on a font that was identified, by an image scanning submodule 322 within the OCR module 320 during OCR extraction, as being the font contained within the target image.

Figure 8:
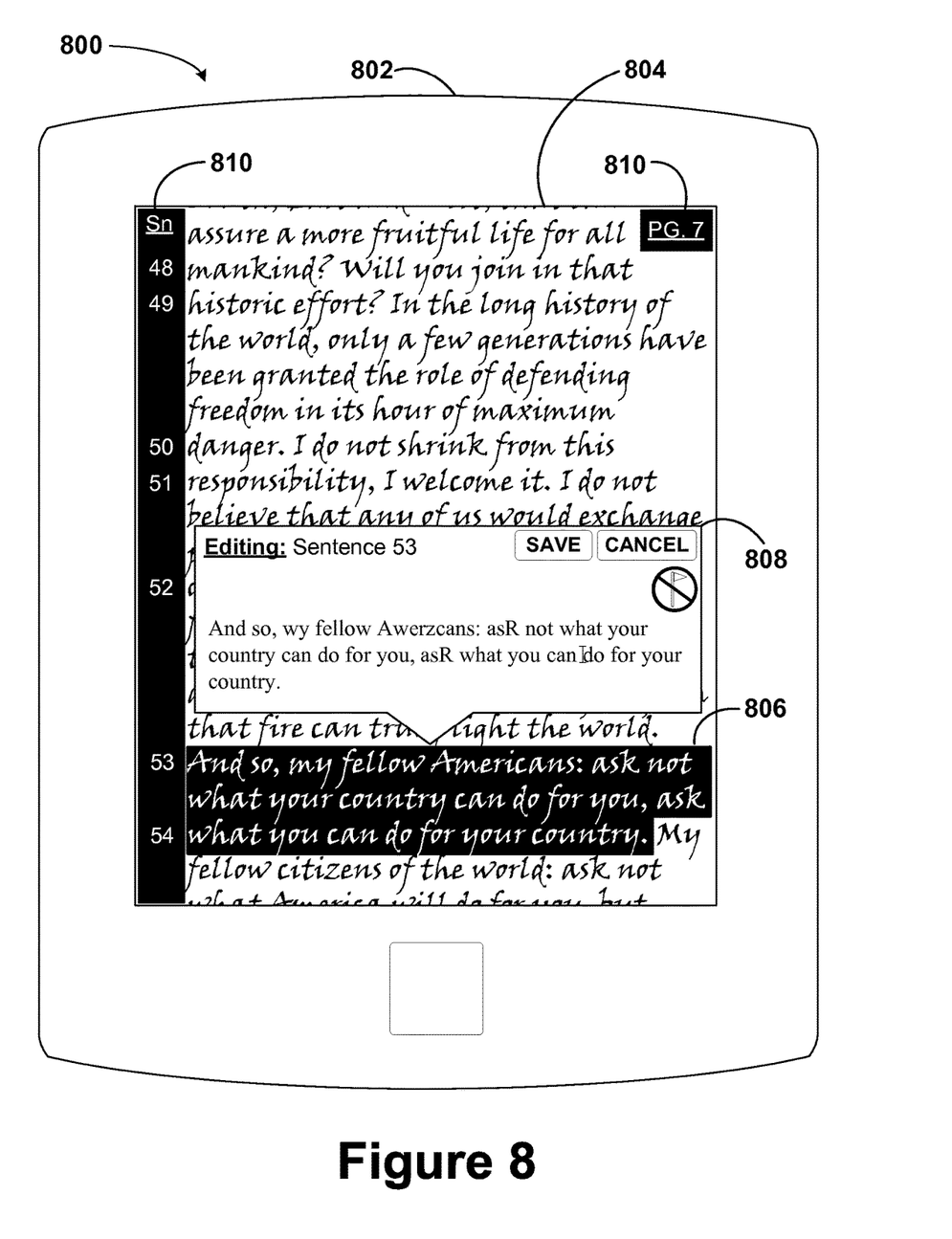
FIG. 8 is an illustration of an editing display, according to an example embodiment.

FIG. 8 is an illustration 800 of an editing display on a display 804 within a terminal device 802, according to an example embodiment. Similar to illustration 700, the editing display includes a highlighted portion 806 of a target image, an editing box 808, and location indicators 810. In the illustration 800, the target image is overlaid by the editing box 808.

This may be the appearance of a user interface that is displayed by an editing display submodule 336 within an editing module 330 within an OCR review element 212 when executed by a processing unit 202, such as in some embodiments of step 404 of method 400.

The highlighted portion 806 of the target image corresponds to a potential error currently being reviewed. In some embodiments, the highlighted portion 806 is selected by a page selection submodule 334 when it jumps to the location of the potential error. In contrast with the highlighted portion 706 of illustration 700, this highlighted portion 806 corresponds to a single sentence.

In some embodiments, there may be a setting, selectable in the options menu that is displayed when engaging the settings button 614, that allows the page selection submodule 334 to jump to a given sentence number, as opposed to a given set of line numbers. As previously described, there may additionally be a setting that allows the potential errors in the error location display to be displayed by sentence number, as opposed to page/line number.

The editing box 808 displays tools to aid in the editing of OCR data. The current sentence number is displayed, in this embodiment, within the editing box 808 based on what section of the target image is selected. In addition, the corresponding, extracted OCR data is shown in the editing box 808. From the editing box 808, text can be added, modified, or deleted, so that the OCR data matches the text in the target image.

There are also two buttons disposed within the editing box 808. As with the editing box 708 depicted in illustration 700, engaging the "SAVE" button would save the changes to the OCR data made within the editing box 808, as in step 406 of method 400, and engaging the "CANCEL" button would cancel any changes made to the OCR data within the editing box 808. After either of these buttons are engaged, the user interface depicted in FIG. 6 may appear on the display 804.

Additionally, in this embodiment, the editing box 808 provides an option to "unflag" the potential error. This "unflag" button functions similarly to that described in the editing box 708 depicted in illustration 700.

In contrast with the location indicators 710 in illustration 700, the location indicators 810 display the sentence number currently being displayed within the target image. In some embodiments, the sentence numbers are an estimate of where each sentence begins within the target image based on locations of periods, identified by an image scanning submodule 322 within the OCR module 320 during OCR extraction.

VI. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed is:

1. A method of revising Optical Character Recognition (OCR) data stored on a non-transitory, computer-readable medium, comprising:
   indexing, by a processor on a terminal device, locations of potential errors within the OCR data, wherein the OCR data is extracted textual information from a target image;

displaying, by the terminal device, a sentence within the target image, wherein displaying the sentence within the target image comprises highlighting the sentence in the target image, and wherein the sentence corresponds to a portion of the OCR data that includes at least one of the potential errors;

displaying, by the terminal device, the portion of the OCR data, wherein the portion of the OCR data is displayed inside an editing box that overlays the target image;

receiving, from a user input device, an editing operation indicating a correction to be made to the OCR data; and editing, by the terminal device, the OCR data in response to the editing operation.

2. The method of claim 1, wherein indexing the locations of potential errors within the OCR data further comprises retrieving the target image with the terminal device using an image capturing unit and extracting the OCR data from the target image, and wherein the image capturing unit is embedded in the terminal device.

3. The method of claim 1, wherein indexing the locations of potential errors within the OCR data further comprises receiving the target image from a repository and extracting the OCR data from the target image.

4. The method of claim 1, wherein indexing the locations of potential errors within the OCR data further comprises calculating an OCR certainty level and comparing the OCR certainty level with a threshold OCR certainty level.

5. The method of claim 1, wherein indexing the locations of potential errors further comprises specifying a character position within the OCR data denoting each location.

6. The method of claim 1, wherein indexing locations of potential errors further comprises specifying a page number and a line number within the OCR data denoting each location.

7. The method of claim 1, wherein displaying the portion of the OCR data further comprises determining the portion of the OCR data to display, wherein determining the portion to display further comprises displaying the locations of potential errors within the OCR data and receiving, by the terminal device, an input from the user input device, wherein the input indicates a selection of the portion from the locations of potential errors within the OCR data, wherein displaying the locations of potential errors comprises displaying one or more jump to buttons associated with the locations of the potential errors, wherein the one or more jump to buttons are displayed in a separate interface from the target image and the editing box, and wherein the input denotes a jump to one of the potential errors.

8. The method of claim 1, wherein editing the OCR data further comprises updating a change history of all changes made to the OCR data.

9. A terminal device configured to revise Optical Character Recognition (OCR) data stored on a non-transitory, computer-readable medium, comprising:

a processor, wherein the processor is configured to execute an OCR review element, wherein the OCR review element is stored on a non-transitory, computer-readable medium and the OCR review element is configured to index locations of potential errors within the OCR data and modify the OCR data, and wherein the OCR data is extracted textual information from a target image;

a display, wherein the display is configured to display a sentence within the target image, wherein the display is configured to highlight the sentence within the target image, wherein the sentence corresponds to a portion of the OCR data that includes at least one of the potential errors, wherein the display is configured to display the portion of the OCR data, and wherein displaying the portion of the OCR data comprises displaying the portion of the OCR data inside an editing box that overlays the target image; and a user input device, wherein the user input device is configured to accept editing operations to be made to the OCR data.

10. The terminal device of claim 9, wherein the OCR review element is further configured to perform an extraction of the OCR data from the target image.

11. The terminal device of claim 9, wherein the OCR review element is further configured to update a change history of all changes made to the OCR data when modifying the OCR data.

12. The terminal device of claim 9, wherein the terminal device is further configured to display the locations of potential errors within the OCR data, enable a selection of the portion of the OCR data that includes at least one of the potential errors, and display editing tools configured to assist in revision of the OCR data.

13. The terminal device of claim 9, further comprising a network interface, wherein the network interface is configured to enable communication between the terminal device and repositories, image forming apparatuses, or other terminal devices, facilitating retrieval of the OCR data.

14. The terminal device of claim 9, further comprising an image capturing unit configured to retrieve image data, wherein the image capturing unit is embedded in the terminal device, and wherein the image data can be processed using the OCR review element.

15. A non-transitory, computer-readable medium comprising an Optical Character Recognition (OCR) review element, wherein the OCR review element, when executed by a processor, is configured to revise OCR data in a manner comprising:

indexing locations of potential errors within the OCR data, wherein the OCR data is extracted textual information from a target image;

displaying a sentence within the target image, wherein displaying the sentence within the target image comprises highlighting the sentence in the target image, and wherein the sentence corresponds to a portion of the OCR data that includes at least one of the potential errors;

displaying the portion of the OCR data, wherein the portion of the OCR data is displayed inside an editing box that overlays the target image;

receiving an editing operation indicating a correction to be made to the OCR data; and editing the OCR data in response to the editing operation.

16. The non-transitory, computer-readable medium of claim 15, wherein indexing the locations of potential errors within the OCR data further comprises calculating an OCR certainty level and comparing the OCR certainty level with a threshold OCR certainty level.

17. The method of claim 1, wherein indexing locations of potential errors within the OCR data comprises storing one or more sentence numbers within the OCR data denoting each location.

18. The method of claim 1, further comprising displaying a sentence number in the editing box, wherein the sentence number displayed in the editing box corresponds to the sentence highlighted in the target image.

19. The method of claim 1, further comprising displaying a location indicator, wherein the location indicator displays a sentence number corresponding to the sentence currently being displayed within the target image, and wherein the location indicator is displayed adjacent to the sentence currently being displayed within the target image.

20. The non-transitory, computer-readable medium of claim 15, wherein indexing locations of potential errors within the OCR data comprises storing one or more sentence numbers within the OCR data denoting each location.

* * * * *